(12) United States Patent
Behrendt

(10) Patent No.: US 12,015,255 B2
(45) Date of Patent: Jun. 18, 2024

(54) GROUNDING ROD

(71) Applicant: David Donald Behrendt, Dunlap, IA (US)

(72) Inventor: David Donald Behrendt, Dunlap, IA (US)

( * ) Notice: Subject to any disclaimer, the term of this patent is extended or adjusted under 35 U.S.C. 154(b) by 1 day.

(21) Appl. No.: 17/731,925

(22) Filed: Apr. 28, 2022

(65) Prior Publication Data

US 2022/0352703 A1 Nov. 3, 2022

Related U.S. Application Data

(60) Provisional application No. 63/180,728, filed on Apr. 28, 2021.

(51) Int. Cl.
*H02G 13/00* (2006.01)
*B62D 49/00* (2006.01)

(52) U.S. Cl.
CPC .............. *H02G 13/40* (2013.01); *B62D 49/00* (2013.01)

(58) Field of Classification Search
CPC .......... H02G 13/40; B62D 49/00; B25D 1/16; H01R 4/66
See application file for complete search history.

(56) References Cited

U.S. PATENT DOCUMENTS

| | | | | |
|---|---|---|---|---|
| 2,693,086 A * | 11/1954 | Caruthers | ................. | E02D 7/04 173/132 |
| 7,817,398 B1 * | 10/2010 | Maples | ................. | H04Q 1/146 361/111 |
| 2004/0154814 A1 * | 8/2004 | Brennan | ................. | H01R 4/66 174/6 |
| 2005/0189129 A1 * | 9/2005 | Rivers | ....................... | E02D 7/04 173/90 |
| 2008/0099197 A1 * | 5/2008 | Payne | ................... | E21B 47/125 166/250.01 |
| 2008/0257113 A1 * | 10/2008 | Neumarkel | ............... | B25D 1/16 81/27 |
| 2014/0196955 A1 * | 7/2014 | Queen | ..................... | E21B 10/44 175/57 |
| 2022/0063077 A1 * | 3/2022 | Gardikis | .................. | H01R 4/66 |

FOREIGN PATENT DOCUMENTS

WO WO-2018071003 A1 * 4/2018 ............... E21B 7/00

OTHER PUBLICATIONS

CN 110687646 A1; published on Jan. 14, 2020 (Year: 2020).*
RU 2690176 C2 English Translation (Year: 2019).*

* cited by examiner

*Primary Examiner* — Pete T Lee
(74) *Attorney, Agent, or Firm* — ZarleyConley PLC

(57) ABSTRACT

A grounding rod having an elongated metal rod, an adjustment member, and a bracket. The bracket is attached to a metal portion of a piece of machinery. The adjustment member is mechanical, electric, or hydraulic and raises and lowers the elongated rod from a transport position where the elongated rod does not engage the ground, to a lowered position where the elongated rod is pushed into the ground.

17 Claims, 1 Drawing Sheet

GROUNDING ROD

CROSS REFERENCE TO RELATED APPLICATION

This application claims the benefit of U.S. Provisional Application Ser. No. 63/180,728 filed Apr. 28, 2021, the content of this application is hereby incorporated by reference in its entirety.

BACKGROUND OF THE INVENTION

This invention is directed to a device, assembly, and/or system that is able to ground a machine during lightning storms. Any type of machinery with highly technological electronic components would benefit from this attachment. From high tech farm equipment to construction equipment, they have all incorporated very expensive computer equipment that is fried if the equipment is struck in a storm. Farming isn't like it used to be. You no longer throw seed in the ground, harvest it and then sell and make a profit. It has become very precise where every inch, every penny counts and all of this must happen in a very tight time frame, so any stop in the operation causes extreme problems for operators. All the new equipment is run off computers, which is an added expense that farmers want to protect. Most equipment even offers a wireless component, as well, which allows one to troubleshoot a machine from their phone and potentially even engage this protection device. As an example, known is that one farmer lost two tractors during a planting season which created a major problem in his time sensitive operation. With machines becoming more technologically advanced and the weather becoming more inclement, owners of such equipment need added protection.

Desired is to ground machines, thus eliminating the risk that farmers and other heavy equipment owners take by leaving their equipment outside exposed to the elements. This will require a mechanical device on the ladder, or somewhere on the machine, that allows a rod to be pushed into the ground before a storm. Placement on the ladder is desired for quick and easy accessibility. The grounding rod needs to be bolted to the frame of the implement. It has to be metal on metal or it will not work. As for the mechanics, it could be a manual rod that would be pushed into the ground by the operator before a storm or another option would be an electric/hydraulic rod operable from a mobile device. The rod could be made of copper, aluminum or metal with a chrome finish. If it is electric it could be set with the ignition switch when the implement turns off, it engages the grounding rod. Another option other than a rod would be metal wires that hang below the machine. It would double as a grounding source for weather and the static electricity from the rubber tires on the pavement and driving through terrain.

SUMMARY OF THE INVENTION

A grounding rod includes an elongated metal rod, an adjustment member connected to the elongated metal rod, a bracket connected to the adjustment member, and the bracket connected to a metal portion of machinery. The elongated metal rod is positioned to be selectively pushed into the ground and raised out of the ground.

The machinery is high-tech farm equipment, high-tech construction equipment, or the like. The elongated metal rod is made of copper, aluminum, has a chrome finish, or the like. The adjustment member is mechanical, electrical, or hydraulic. In one example, the adjustment member is associated with the ignition switch of the machinery to automatically raise and lower the elongated rod.

DETAILED DESCRIPTION

Figure 2:
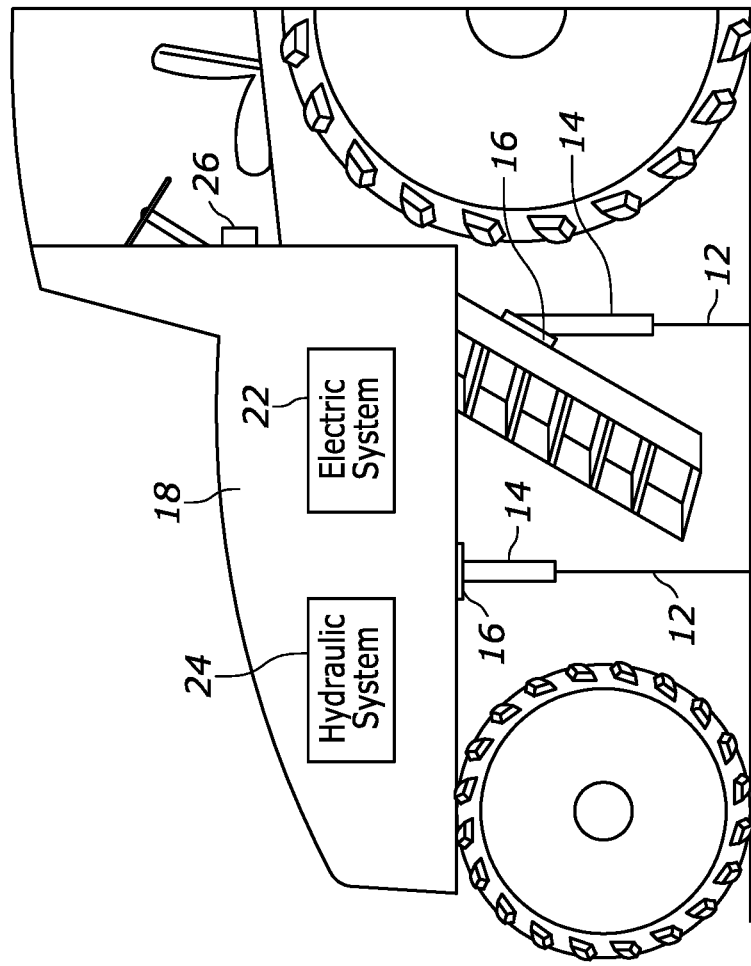
FIG. 2 is a side view of a grounding rod and machinery.
Figure 1:
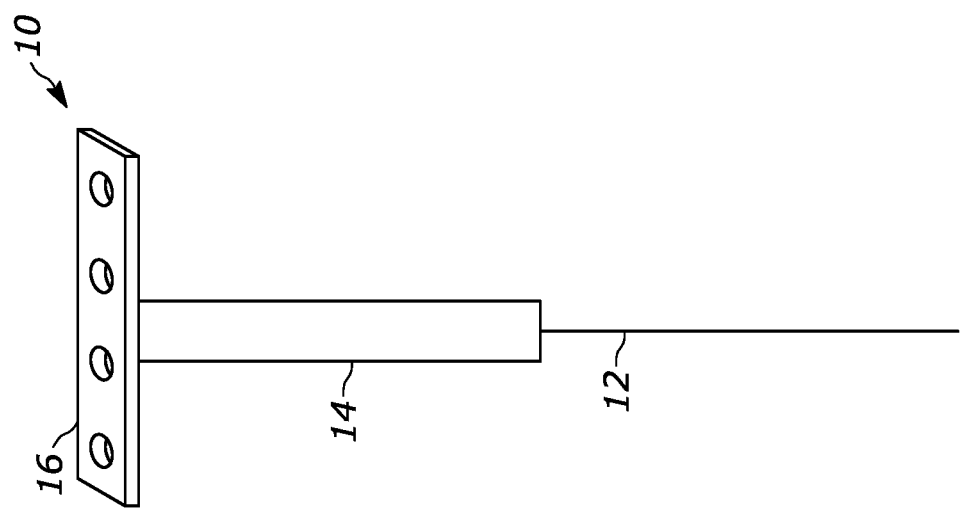
FIG. 1 is a side view of a grounding rod.

Referring to the Figures, a grounding rod 10 includes an elongated metal rod 12, an adjustment member 14, and a bracket 16. The grounding rod is for use with any type of machinery 18 with electronic equipment such as high-tech farm equipment, high-tech construction equipment, and the like. The metal rod 12 is made of any type of metal such as copper, aluminum, a metal with a chrome finish or the like. The adjustment member 14 is of any type that permits the rod 12 to be moved toward and away from the bracket 16, and is mechanical, electric, or hydraulic. The bracket 16 is of any size, shape and structure that permits the grounding rod 10 to be attached to a metal portion of the machinery 18 in any conventional way such as with nuts and bolts or the like.

In operation, the grounding rod 10, using the bracket 16, is attached to the machinery 18 at any location. In the examples shown, the grounding rod 10 is attached either to a ladder or to the frame of the machinery 18. Once attached, during a transport position, the elongated rod 12 is in a raised position so that it does not engage the ground surface 20. When the machinery is no longer in use, using the adjustment member 14, the elongated rod 12 is lowered with sufficient force that it is pushed into the ground 20. This is done either manually by the operator, or through the electrical 22 or hydraulic 24 system of the machinery 18. The adjustment member 14 can also be associated with the ignition switch 26 of the machinery so that when the machinery 18 is turned off, the adjustment member automatically lowers the rod 12 into the ground 20 and when turned on automatically raises the rod 12 so that it does not engage the ground 20.

From the above discussion and accompanying figures and claims it will be appreciated that the grounding rod offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:
1. A grounding rod system, comprising:
an elongated metal rod;
an adjustment member connected to the elongated metal rod;
a bracket connected to the adjustment member;
the bracket connected to a metal portion of a machinery;
wherein the elongated metal rod is positioned to be selectively pushed into a ground surface and raised out of the ground surface; and the machinery having an ignition switch that raises and lowers the elongated metal rod out of the ground surface.

2. The grounding rod system of claim 1 wherein the machinery is selected from a group consisting of a farm equipment and a construction equipment.

3. The grounding rod system of claim 1 wherein the elongated metal rod is made of a material selected from a group consisting of copper, aluminum, and a chrome finish.

4. The grounding rod system of claim 1 wherein the adjustment member is of a type selected from a group consisting of mechanical, electrical, and hydraulic.

5. The grounding rod system of claim 1 wherein when the ignition switch is transitioned to an off position, the adjustment member automatically lowers the elongated metal rod into the ground surface; and wherein when the ignition switch is transitioned to an on position, the adjustment member automatically raises the elongated metal rod out of the ground surface.

6. A grounding rod system, comprising:
a machinery having a metal portion;
a bracket connected to the metal portion of the machinery;
an adjustment member connected to the bracket and an elongated metal rod, wherein the adjustment member is configured to selectively transition between a raised position where the elongated metal rod does not engage a ground surface and a lowered position where the elongated metal rod is inserted into the ground surface by force applied by the adjustment member; and
the machinery having an ignition switch that raises and lowers the elongated metal rod.

7. The grounding rod system of claim 6 wherein when the ignition switch is transitioned to an off position, the adjustment member automatically lowers the elongated metal rod to the lowered position; and wherein when the ignition switch is transitioned to an on position, the adjustment member automatically raises the elongated metal rod to the raised position.

8. The grounding rod system of claim 6 wherein the machinery is selected from a group consisting of a farm equipment and a construction equipment.

9. The grounding rod system of claim 6 wherein the elongated metal rod is made of a material selected from a group consisting of copper, aluminum, and a chrome finish.

10. The grounding rod system of claim 1 wherein the adjustment member is of a type of operation selected from a group consisting of manual, mechanical, electrical, and hydraulic.

11. A grounding rod system, comprising:
a machinery having a metal portion;
a bracket connected to the metal portion of the machinery; and
an adjustment member connected to the bracket and an elongated metal rod; and
the machinery having an ignition switch;
wherein when the ignition switch is transitioned to an off position, the adjustment member automatically lowers the elongated metal rod into a ground surface in a direction away from the bracket;
wherein when the ignition switch is transitioned to an on position, the adjustment member automatically raises the elongated metal rod out of the ground surface in a direction towards the bracket.

12. The grounding rod system of claim 11 wherein the metal portion is positioned on a ladder of the machinery.

13. The grounding rod system of claim 12 wherein the elongated metal rod is made of a material selected from a group consisting of copper, aluminum, and a chrome finish.

14. The grounding rod system of claim 13 wherein the adjustment member is of a type of operation selected from a group consisting of manual, mechanical, electrical, and hydraulic.

15. The grounding rod system of claim 14 wherein the machinery is selected from a group consisting of a farm equipment and a construction equipment.

16. The grounding rod system of claim 1 wherein the metal portion is positioned on a ladder of the machinery.

17. The grounding rod system of claim 6 wherein the metal portion is positioned on a ladder of the machinery.

\* \* \* \* \*